United States Patent [19]
Neil

[11] Patent Number: 4,505,535
[45] Date of Patent: Mar. 19, 1985

[54] INFRARED OBJECTIVE LENS SYSTEMS
[75] Inventor: Iain A. Neil, Strathblane, Scotland
[73] Assignee: Barr & Stroud Limited, Glasgow, Scotland
[21] Appl. No.: 498,004
[22] Filed: May 23, 1983
[30] Foreign Application Priority Data
  Feb. 6, 1982 [GB] United Kingdom ............... 8216035
[51] Int. Cl.³ .......................................... G02B 9/34
[52] U.S. Cl. ................................. 350/1.3; 350/469
[58] Field of Search ............... 350/1.2, 1.3, 1.4, 469

[56] References Cited
U.S. PATENT DOCUMENTS
3,321,264  5/1967  Sijgers et al. ................. 350/1.3
4,380,363  4/1983  Fjeldsted ...................... 350/1.3

Primary Examiner—John K. Corbin
Assistant Examiner—William Propp
Attorney, Agent, or Firm—Mason, Fenwick & Lawrence

[57] ABSTRACT

An infrared objective lens system (15) comprises a primary lens group (13) air spaced from a secondary lens group (14) by means of a support assembly (16). The primary lens group (13) and secondary lens group (14) are aligned on a common optical axis (10) and are arranged to form a real image (9) at an external image surface from infrared radiation entering the system (15) through a pupil ∅ in object space (11). Primary lens group (13) is self-compensated for chromatic aberrations, is positively powered and is made of material the refractive index of which is relatively temperature insensitive such as arsenic triselenide and/or zinc selenide. The secondary lens group (14) is positively powered, introduces minimal chromatic aberrations and is formed by a positively powered lens (C) and a negatively powered lens (D). Lens (C) is made of material the refractive index of which is relatively temperature insensitive such as arsenic triselenide. Lens (D) is made of a material the refractive index of which is relatively temperature sensitive such as germanium and the thermal aberration introduced by lens (D) is arranged to compensate for thermal aberrations introduced by the primary lens group (13) and secondary lens group (14) caused by thermal expansion of the support assembly (16) as a result of which the system (15) is rendered substantially passively athermal.

8 Claims, 1 Drawing Figure

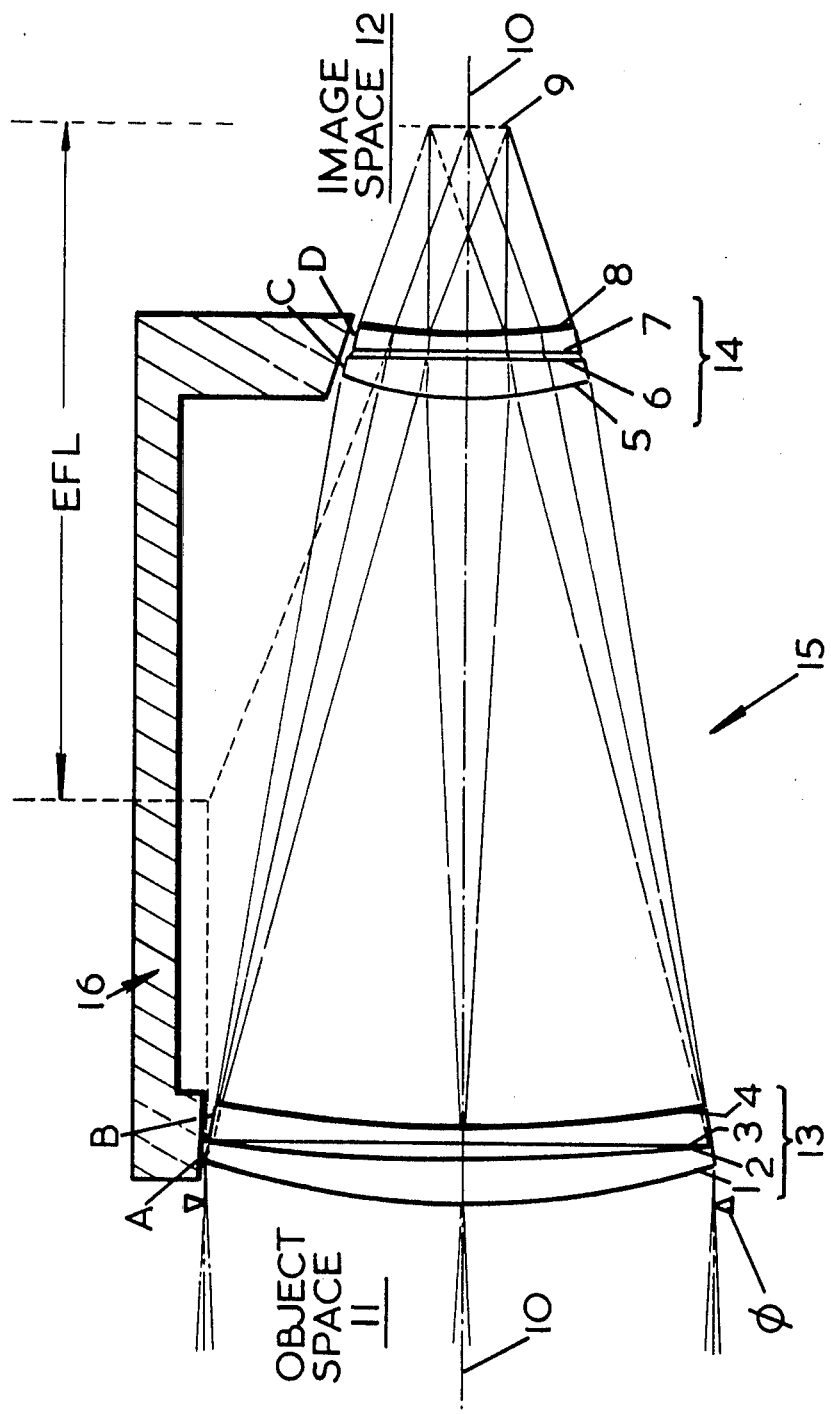

INFRARED OBJECTIVE LENS SYSTEMS

This invention relates to infrared objective lens systems for delivering infrared radiation to a radiation detecting system.

The arrival of high performance infrared radiation detectors has led to a demand for a high performance objective lens system, and a number of designs have been developed where the objective system resolution is diffraction limited.

One requirement imposed on the system is that it is substantially free from chromatic aberrations. This is usually achieved in the known systems by making the principal lens of the system, if not all the lenses of the system, from germanium because germanium inherently has a very low value of dispersion coefficient and accordingly inherently introduces very low levels of chromatic aberration.

Another requirement imposed on the system is that it is substantially free from thermal aberrations, that is that its design resolution is maintained over a wide range of temperatures to which the system could be subjected when in use. Unfortunately the refractive index of germanium, in comparison to most other infrared materials, is very highly temperature sensitive so that although germanium is attractive for elimination of chromatic aberrations it poses considerable problems for thermal aberration elimination. In the known system thermal aberration compensation is achieved by utilising a complex assembly for supporting the lenses in a manner such that the displacement of the lenses caused by thermal expansion of the support assembly is complementary to the changes in optical characteristics of the lenses throughout the temperature range. Such an assembly is mechanically complex and detracts from the overall compactness and simplicity of the system.

It is an object of the present invention to provide an improved form of infrared objective system for delivering infrared radiation to a radiation detecting system in which the foregoing disadvantages are obviated or mitigated.

According to the present invention there is provided an infrared objective lens system for delivering infrared radiation to a radiation detecting system, said objective lens system comprising a primary and a secondary mounted in spaced apart relationship on a common support assembly and aligned on a common optical axis, wherein the primary is arranged to accept infrared radiation from a pupil, the secondary is arranged to accept radiation from the primary and to form a real image thereof at an external image surface, the primary being substantially self-compensated for chromatic aberrations, positively powered and made of material the refractive index of which is relatively temperature insensitive, the secondary is positively powered, introduces minimal chromatic aberrations, and is formed by a positively powered lens made of material the refractive index of which is relatively temperature insensitive and a negatively powered lens made of material the refractive index of which is relatively temperature sensitive, the arrangement being such that the thermal aberrations introduced by the primary and relative displacements of the primary and secondary caused by thermal expansion of the support assembly are compensated by thermal aberration introduced by said negatively powered lens so that the objective system is rendered substantially passively athermal.

The primary may comprise more than one lens element in which case chromatic aberration compensation is achieved by utilizing two different materials for the lens element in a manner known per se. In such an arrangement the refractive surfaces of the lens elements are preferably spherical or planar and the materials used may be selected from those numbered 2-9 in Table VII hereof.

Alternatively, the primary may comprise only a single lens element in which case chromatic aberration compensation is achieved by selection of the lens material but since there is the requirement that the material refractive index has relatively low thermal sensitivity this can only be achieved with currently known materials by using diamond. In this case the lens element may have an aspheric surface to compensate for substantially monochromatic aberrations introduced by a window having zero or very low optical power and through which the radiation is transmitted prior to refraction by the primary lens.

The secondary may comprise only two lens elements of which the positively powered element is made of a material which introduces color aberrations but because such aberrations are determined in part by the optical power, in part by the aperture and in part by the dispersive coefficient of the material they can be kept to a minimum level at which their effect on the system performance as a whole is negligible. The material of this lens element may be selected from those numbered 2-9 in Table VII hereof. The negatively powered lens element of the secondary is preferably germanium which is inherently free of chromatic aberration but because of its negative power and the fact that its refractive index is relatively thermally sensitive the thermal aberration introduced, which is a function of power and refractive index thermal coefficient, can be designed to compensate for the thermal aberrations introduced to the objective system by the primary and by the other lens element(s) of the secondary and by the lens displacements introduced by thermal expansion of the support assembly.

It will be appreciated that thermal sensitivity of refractive index is effective to affect the focal length of a lens element.

Preferably the lens support assembly is primarily made of a single material such as aluminium or stainless steel or invar. It will be appreciated that aluminium has a relatively large coefficient of thermal expansion but by virtue of the optical design of the system according to the present invention the lens displacement introduced by aluminium can be compensated. This arises because of the very considerable compensation available from the negative-powered lens of the secondary especially when this lens is made of germanium. Accordingly, the lens support assembly can be as mechanically simple as is practical.

By virtue of the present invention the external image surface of the objective system remains substantially in one position in space over a wide range of temperatures and accordingly when a detecting system is located at that image surface the resolution of the objective system is maintained substantially constant. It is to be noted however that where the objective system of the present invention is to be utilised with a detecting system that itself is subject to displacement caused by thermal expansion of its own support the thermal compensation available within the objective system is sufficient to permit variation in position of the image surface so as to compensate for movement of the detecting surface of the detecting system. Furthermore the image surface can be designed to be flat or curved which for the attachment of different detecting systems can be advantageous. Near diffraction limited resolution can be achieved and in certain designs of objective system all refractive surfaces can be made spherical and of sufficiently large radius of curvature that simultaneous bulk manufacture of lens elements is practical.

An embodiment of the present invention will now be described by way of example with reference to the accompanying schematic drawing and accompanying tables.

As is shown in the drawing an objective system 15 is formed by a primary 13 and a secondary 14 aligned on a common optical axis 10. The objective system 15 is of the focal refractor type and accepts bundles of parallel rays over the field of view from an entrance pupil ∅ formed in object space 11 and produces bundles of convergent rays over the field of view which form an image 9 in image space 12.

The primary 13 is formed by a positively powered lens element A and a negatively powered lens element B, the two elements together forming a doublet and providing low chromatic aberrations. The secondary 14 is formed by a positively powered lens element C and a negatively powered lens element D each of which, together, and in particular lens element D, produce low chromatic aberrations, lens element D being made of a material which has a significantly greater thermal coefficient of refractive index than those materials which make lens elements A, B and C.

The lens elements A,B,C and D have respective refractive surfaces 1,2; 3,4; 5,6; and 7,8. The refractive surfaces 1,2,3,4,5,6, 7 and 8 are each substantially spherical, i.e. if they are not truly spherical they are 'spherical' with the meaning of the art. The optical power of and the spacing between the various lens elements A,B,C and D is arranged such that the real image 9 is proximal refractive surface 8 and is external to the objective system 15.

The lens elements A,B,C and D are supported in position by a support assembly 16 shown schematically but which is primarily made of a single material and free from complex thermal compensating components.

The four lens elements A,B,C,D which together form the objective system 15 are made from at least three different materials, the positively powered lens element C may be made from the same material as that of either the positively (A) or the negatively (B) powered lens element of the primary 13. The negatively powered lens element (D) is made from a material which in comparison to the materials which make the other three lens elements A,B,C has lower dispersion and a high thermal coefficient of refractive index.

The relative position of the two lens elements in each of the primary and secondary 13, 14 is incidental i.e. they may be interchanged in position if so desired so that, for example, primary 13 has element B adjacent the pupil ∅.

The two positive lens elements A,C can be made from any of the materials recited in Table VII excluding germanium, the preferable materials being numbers 2-9 inclusive. The negative element B can also be made from any of these materials excluding germanium, the preferable materials being numbers 10 and 11 in Table VII. Germanium is unsuitable for use in lens elements A or B because of its high thermal coefficient of refractive index, however because of this fact and its low dispersion it is ideal for use in the negatively powered lens element D.

It will be noted that the materials so far discussed have been for use in the 8-13 micron waveband, however these and other materials are available which can provide similar properties in the 3-5 micron waveband.

The system 15 is fixed focus but any one lens element or combination of lens elements can be axially moved to accommodate targets in object space at different distances. This does not affect the thermal compensation but does require introduction of active mechanics in support assembly 16.

By way of a specific example, the system 15 may be manufactured with lens elements A and C made of BSA (number 4 in Table VII), lens element B made of Zinc Selenide (number 10 in Table VII) and lens element D made of germanium (number 1 in Table VII). In this case the system parameters are set forth in Tables I-VI hereof of which Tables I and II are particular to a temperature of +20° C., Tables III and IV are particular to a temperature of +80° C., and Tables V and VI are particular to a temperature of −40° C. All lens elements are supported by an assembly 16 made of aluminium.

It will be seen from Tables I to VI that at the best focus the system at +80° C. and −40° C. is out of focus by only −15 microns and +13 microns respectively in relation to the focus at +20° C., the negative and positive defocus signs indicating that the objective system 15 per se is slightly overcompensated for thermal effects. Such 'defocussing' of the objective system 15 per se is sufficient to compensate for the variation in position of the detecting surface of a known form of the detecting system arising from thermal expansion of the detecting system itself. A support assembly material of higher thermal expansion coefficient than aluminium could correct the objective system 15 per se totally for this or the optics could be slightly re-optimized without changing the lens materials if a totally compensated objective system were required.

The objective system 15 detailed has an effective focal length of 51 mm, accommodates a total diagonal field of 5° and produces convergent cones of rays operating at f/1.5 which is highly suitable for many detectors.

The objective system of Tables I-VI is one of a family of systems which can be scaled for effective focal length (being the length denoted EFL in the drawing), aperture, field and f number. In each case the system produces very little distortion and there is no vignetting. The object space pupil ∅ can vary in position either away from primary 13 or into the air gap between primary 13 and secondary 14 depending on the tolerable resolution degradation which is considered acceptable.

TABLE I

| Item | Surface | Separation | Radius of Curvature | Material | Aperture Diameter |
|---|---|---|---|---|---|
| Pupil* | ∅ | 0 | Flat | Air | 35.00 |
| A | 1 | 0 | 57.24 | Air | 35.24 |
|  | 2 | 3.250 | 209.89 | As$_2$Se$_3$ (BSA) | 34.79 |
| B | 3 | 0.750 | 589.38 | Air | 34.57 |
|  | 4 | 1.250 | 99.97 | ZnSe | 33.73 |
| C | 5 | 50.000 | 27.46 | Air | 16.38 |
|  | 6 | 2.500 | 342.17 | As$_2$Se$_3$ (BSA) | 15.68 |
| D | 7 | 0.500 | 531.15 | Air | 14.86 |
|  | 8 | 1.250 | 59.23 | Ge | 14.28 |

TABLE I-continued

| Item | Surface | Separation | Radius of Curvature | Material | Aperture Diameter |
|---|---|---|---|---|---|
| Image** Plane | 9 | 14.015 | Flat | Air | Image Diameter 4.4 |

*Maximum field angle at entrance pupil = 5°.
**At best focus averaged over the maximum field.
All aluminium supporting structure where each lens element and image plane are connected in series at the maximum aperture diameter.
All data given at 20° C.

TABLE II

Approximate R.M.S. Spot Sizes at Image Plane* (in microns)

| Field (maximum = 5°) | Monochromatic at 10.0 microns | **Polychromatic over 8.0–12.0 microns |
|---|---|---|
| Axial | 1.8 | 3.1 |
| ½ | 3.2 | 6.8 |
| ¾ | 6.4 | 10.5 |
| Full | 11.4 | 15.6 |

*At best focus averaged over the field.
**Given as an equally weighted three wavelength accumulated measurement, the wavelengths being 8.0, 10.0 and 12.0 microns.
All data given at 20° C.

TABLE III

| Item | Surface | Separation | Radius of Curvature | Material | Aperture Diameter |
|---|---|---|---|---|---|
| Pupil* | 0 | 0 | Flat | Air | 35.00 |
| A | 1 | 0.008 | 57.32 | Air | 35.24 |
|  | 2 | 3.254 | 210.17 | As₂Se₃ (BSA) | 34.79 |
| B | 3 | 0.753 | 589.66 | Air | 34.57 |
|  | 4 | 1.251 | 100.02 | ZnSe | 33.73 |
| C | 5 | 50.074 | 27.49 | Air | 16.34 |
|  | 6 | 2.503 | 342.63 | As₂Se₃ (BSA) | 15.63 |
| D | 7 | 0.504 | 531.35 | Air | 14.81 |
|  | 8 | 1.250 | 59.25 | Ge | 14.23 |
| Image Plane** | 9 | 14.000 | Flat | Air | Image Diameter 4.4 |

*Maximum field angle at entrance pupil = 5°.
**At best focus averaged over the maximum field.
All aluminium supporting structure where each lens element and image plane are connected in series at the maximum aperture diameter.
All data given at 80° C.

TABLE IV

Approximate R.M.S. Spot Sizes at Image Plane* (in microns).

| Field (maximum = 5°) | Monochromatic at 10.0 microns | **Polychromatic over 8.0–12.0 microns |
|---|---|---|
| Axial | 1.5 | 3.1 |
| ½ | 2.9 | 6.7 |
| ¾ | 6.2 | 10.4 |
| Full | 11.1 | 15.5 |

*At best focus averaged over the field.
**Given as an equally weighted three wavelength accumulated measurement, the wavelengths being 8.0, 10.0 and 12.0 microns.
All data given at 80° C.

TABLE V

| Item | Surface | Separation | Radius of Curvature | Material | Aperture Diameter |
|---|---|---|---|---|---|
| Pupil* | 0 | 0 | Flat | Air | 35.00 |
| A | 1 | −0.008 | 57.17 | Air | 35.24 |
|  | 2 | 3.246 | 209.61 | As₂Se₃ (BSA) | 34.79 |
| B | 3 | 0.747 | 589.10 | Air | 34.58 |
|  | 4 | 1.249 | 99.93 | ZnSe | 33.74 |
| C | 5 | 49.925 | 27.42 | Air | 16.42 |
|  | 6 | 2.497 | 341.72 | As₂Se₃ (BSA) | 15.72 |
| D | 7 | 0.496 | 530.96 | Air | 14.92 |
|  | 8 | 1.250 | 59.21 | Ge | 14.33 |
| Image Plane** | 9 | 14.028 | Flat | Air | Image Diameter 4.4 |

*Maximum field angle at entrance pupil = 5°.
**At best focus averaged over the maximum field.
All aluminium supporting structure where each lens element and image plane are connected in series at the maximum aperture diameter.
All data given at −40° C.

TABLE VI

Approximate R.M.S. Spot Sizes at Image Plane* (in microns)

| Field (maximum = 5°) | Monochromatic at 10.0 microns | **Polychromatic over 8.0–12.0 microns |
|---|---|---|
| Axial | 2.5 | 3.4 |
| ½ | 3.7 | 7.0 |
| ¾ | 6.8 | 10.7 |
| Full | 11.8 | 15.9 |

*At best focus averaged over the field.
**Given as an equally weighted three wavelength accumulated measurement, the wavelengths being 8.0, 10.0 and 12.0 microns.
All data given at −40° C.

TABLE VII

| Materials | Refractive Index at 10.0 microns | Primary Coefficient of Dispersion* | Thermal Coefficient of Expansion × 10⁷/°C. | Thermal Coefficient of Refractive Index × 10⁷/°C. |
|---|---|---|---|---|
| 1 Ge | 4.00320 | 0.00187 | 61 | 3960 |
| 2 GaAs | 3.27789 | 0.01067 | 57 | — |
| 3 BS2 | 2.85632 | 0.00503 | — | — |
| 4 BSA | 2.77880 | 0.00568 | 220 | 740 |
| 5 CdTe | 2.67517 | 0.00544 | 50 | 951 |
| 6 TI 1173 | 2.60037 | 0.00772 | 158 | 790 |
| 7 AMTIR1 | 2.49748 | 0.00589 | 130 | 850 |
| 8 BS1 | 2.49143 | 0.00670 | 128 | 700 |
| 9 TI20 | 2.49166 | 0.00679 | 133 | 719 |
| 10 ZnSe | 2.40652 | 0.01216 | 78 | 520 |
| 11 ZnS | 2.20030 | 0.02651 | 68 | 463 |

*Over the wavelength range 8.0–12.0 microns.
All data approximate and given at approximately 20° C.

What is claimed is:

1. An infrared objective lens system for delivering infrared radiation to a radiation detecting system, said objective lens system comprising a primary lens group and a secondary lens group mounted in spaced apart relationship on a common support assembly and aligned on a common optical axis, wherein the primary lens group is arranged to accept infrared radiation from a pupil, the secondary lens group is arranged to accept radiation from the primary lens group and to form a real image thereof at an external image surface, the primary lens group being substantially self-compensated for chromatic aberrations, positively powered, and made of material the refractive index of which is relatively temperature insensitive, the secondary lens group is positively powered, introduces minimal chromatic aberrations, and is formed by a positively powered lens made of material the refractive index of which is relatively temperature insensitive and a negatively powered lens made of material the refractive index of which is relatively temperature sensitive, the arrangement being such that thermal aberrations introduced by the primary lens group and relative displacements of the primary lens group and secondary lens group caused by thermal expansion of the support assembly are compensated by thermal aberration introduced by said negatively powered lens so that the objective system is rendered substantially passively athermal.

2. An objective lens system as claimed in claim 1, wherein said primary lens group is formed by two lens elements closely spaced and forming a doublet.

3. An objective lens system as claimed in claim 2, wherein said doublet is formed by an arsenic triselenide (BSA) lens element and a zinc selenide lens element.

4. An objective lens system as claimed in claim 1, wherein said positively powered lens is formed by a single lens element and said negatively powered lens is formed by a single lens element.

5. An objective lens system as claimed in claim 4, wherein said positively powered lens is formed by an arsenic triselenide (BSA) lens element, and said negatively powered lens is formed by a germanium lens element.

6. An objective lens system as claimed in claim 1, wherein said common support assembly is made of aluminium.

7. An objective lens system as claimed in claim 1, wherein said primary lens group is formed by two lens elements, A and B, closely spaced and said secondary lens group is formed by two lens elements, C and D, closely spaced and further wherein

| Item | Surface | Separation | Radius of Curvature | Material | Aperture Diameter |
|---|---|---|---|---|---|
| Pupil | 0 | 0 | Flat | Air | 35.00 |
| A | 1 | 0 | 57.24 | Air | 35.24 |
|   | 2 | 3.250 | 209.89 | $As_2Se_3$ (BSA) | 34.79 |
| B | 3 | 0.750 | 589.38 | Air | 34.57 |
|   | 4 | 1.250 | 99.97 | ZnSe | 33.73 |
| C | 5 | 50.000 | 27.46 | Air | 16.38 |
|   | 6 | 2.500 | 342.17 | $As_2Se_3$ (BSA) | 15.68 |
| D | 7 | 0.500 | 531.15 | Air | 14.86 |
|   | 8 | 1.250 | 59.23 | Ge | 14.28 |
| Image Plane | 9 | 14.015 | Flat | Air | Image Diameter 4.4 |

8. An objective lens system as claimed in claim 1 in combination with a radiation detecting system having a detecting surface located at said real image and wherein the combination is rendered substantially passively athermal by selecting the degree of thermal aberration introduced by said negatively powered lens to compensate for thermal aberrations introduced by the primary lens group, relative displacements of the primary lens group and secondary lens group caused by thermal expansion of the common support assembly and thermal expansion of the detecting system.

* * * * *

UNITED STATES PATENT AND TRADEMARK OFFICE
CERTIFICATE OF CORRECTION

PATENT NO. : 4,505,535
DATED : March 19, 1985
INVENTOR(S) : Iain A. Neil

It is certified that error appears in the above–identified patent and that said Letters Patent are hereby corrected as shown below:

```
On the title page;
In the Foreign Application Priority Data at data item [30],"Feb. 6, 1982" should read --June 2, 1982--.
```

Signed and Sealed this

Seventeenth Day of September 1985

[SEAL]

Attest:

Attesting Officer

DONALD J. QUIGG

Commissioner of Patents and
Trademarks—Designate